(12) United States Patent
Cao et al.

(10) Patent No.: US 9,208,406 B2
(45) Date of Patent: Dec. 8, 2015

(54) DUAL CARD CONNECTOR AND WIRELESS ELECTRONIC DEVICE EMPLOYING SAME

(71) Applicants: SHENZHEN FUTAIHONG PRECISION INDUSTRY CO., LTD., Shenzhen (CN); FIH (Hong Kong) Limited, Kowloon (HK)

(72) Inventors: Li-Fang Cao, Shenzhen (CN); Hua-Feng Hao, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/314,861

(22) Filed: Jun. 25, 2014

(65) Prior Publication Data

US 2015/0004846 A1 Jan. 1, 2015

(30) Foreign Application Priority Data

Jun. 28, 2013 (CN) .......................... 2013 1 02659752

(51) Int. Cl.
| | |
|---|---|
| H01R 12/72 | (2011.01) |
| G06K 13/08 | (2006.01) |
| H04B 1/3816 | (2015.01) |
| G06K 7/00 | (2006.01) |
| H04M 1/02 | (2006.01) |

(52) U.S. Cl.
CPC .............. *G06K 13/08* (2013.01); *G06K 7/0034* (2013.01); *H04B 1/3816* (2013.01); *H04M 1/0274* (2013.01)

(58) Field of Classification Search
CPC ...... H04B 1/3816; G06K 13/08; H01R 12/00; H01R 12/16
USPC ................................................ 439/631, 541.5
See application file for complete search history.

(56) References Cited

U.S. PATENT DOCUMENTS

| | | | | |
|---|---|---|---|---|
| 5,688,130 | A * | 11/1997 | Huang ........................ | 439/541.5 |
| 6,634,905 | B2 * | 10/2003 | Kuo ............................ | 439/541.5 |
| 6,736,671 | B2 * | 5/2004 | Lee ............................. | 439/541.5 |
| 7,027,852 | B2 * | 4/2006 | Helland ....................... | 600/375 |
| 7,044,748 | B2 * | 5/2006 | Korsunsky et al. ........... | 439/74 |
| 7,226,311 | B2 * | 6/2007 | Sugita ........................ | 439/541.5 |
| 7,494,372 | B2 * | 2/2009 | Peng et al. .................. | 439/541.5 |
| 7,566,227 | B2 * | 7/2009 | Li .................................. | 439/65 |
| 8,070,521 | B2 * | 12/2011 | Li ................................ | 439/631 |
| 8,092,233 | B1 * | 1/2012 | Lee et al. ....................... | 439/74 |
| 2004/0092149 | A1 * | 5/2004 | Scuteri et al. ................ | 439/326 |
| 2008/0199132 | A1 * | 8/2008 | Pitwon .......................... | 385/53 |

* cited by examiner

*Primary Examiner* — Briggitte R Hammond
(74) *Attorney, Agent, or Firm* — Novak Druce Connolly Bove + Quigg LLP

(57) ABSTRACT

A dual card connector includes a holder and a base body. The holder defines two overlapped sliding slots for receiving cards, each sliding slot includes a group of conductive terminal assemblies, the holder includes a plurality of elastic pieces, the elastic pieces are connected to the conductive terminal assemblies. The base body includes at least two groups of connecting terminals. The holder is detachably mounted to the base body, thus the elastic pieces are resisted and electrically connected to the connecting terminals. An electronic device employing the dual card connector is also disclosed.

14 Claims, 3 Drawing Sheets

DUAL CARD CONNECTOR AND WIRELESS ELECTRONIC DEVICE EMPLOYING SAME

FIELD

The present disclosure relates to a dual card connector and an electronic device employing the dual card connector.

BACKGROUND

Dual card dual standby electronic devices have been developed and released for satisfying different requirements. In one way, the dual card electronic device normally uses two single card connectors in parallel connection, which occupy a large space of a circuit board. In another way, the dual card electronic device normally uses two single card connectors in an overlapping connection, which usually requires two corresponding circuit boards for each connection.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
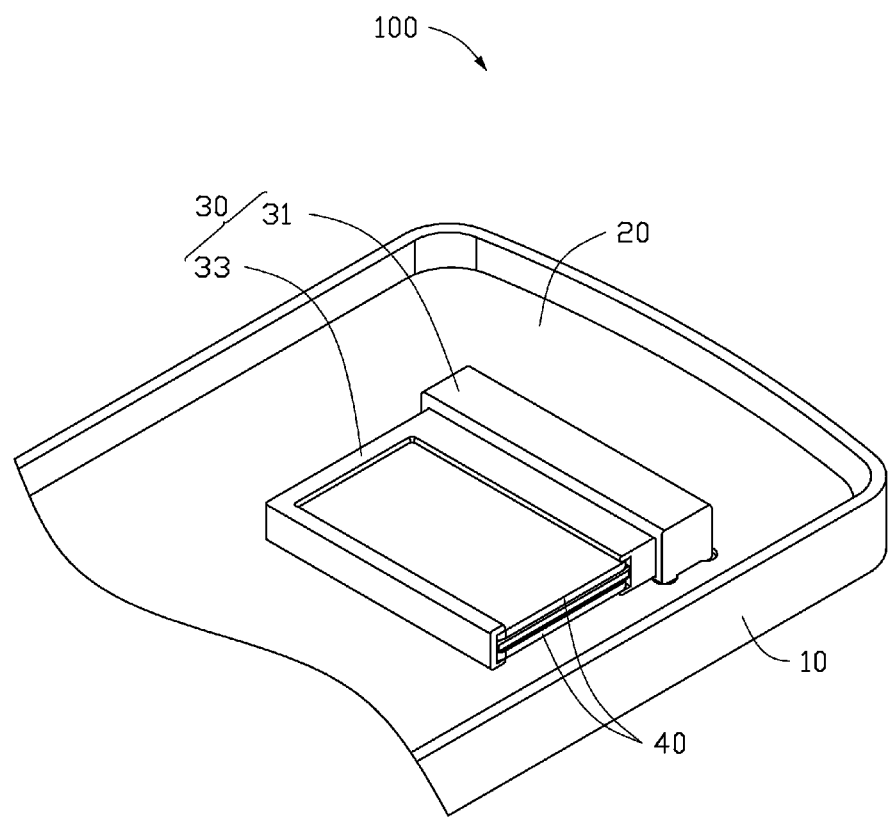
FIG. 1 is an isometric view of an exemplary embodiment of an electronic device including a dual card connector.

FIG. 1 illustrates an exemplary embodiment of an electronic device 100 including a dual card connector 30. The dual card connector 30 can receive two cards 40 at the same time. The electronic device 100 includes a main body 10, a cover (not shown) covering the main body 10, a circuit board 20, and the dual card connector 30. The cards 40 can be Subscriber Identity Module (SIM) cards or memory cards, for example. The circuit board 20 and the dual card connector 30 are mounted on the main body 10.

Figure 2:
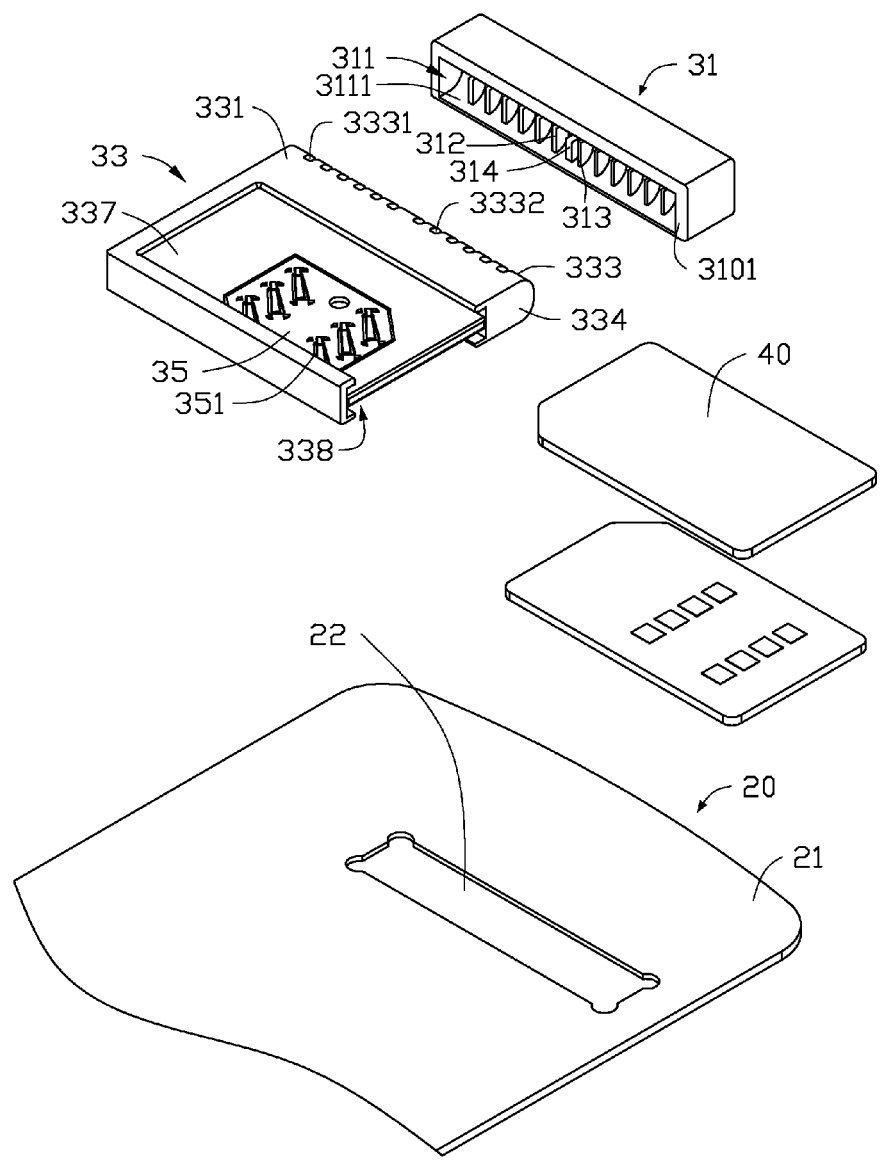
FIG. 2 is an exploded view of the dual card connector shown in FIG. 1.
Figure 3:
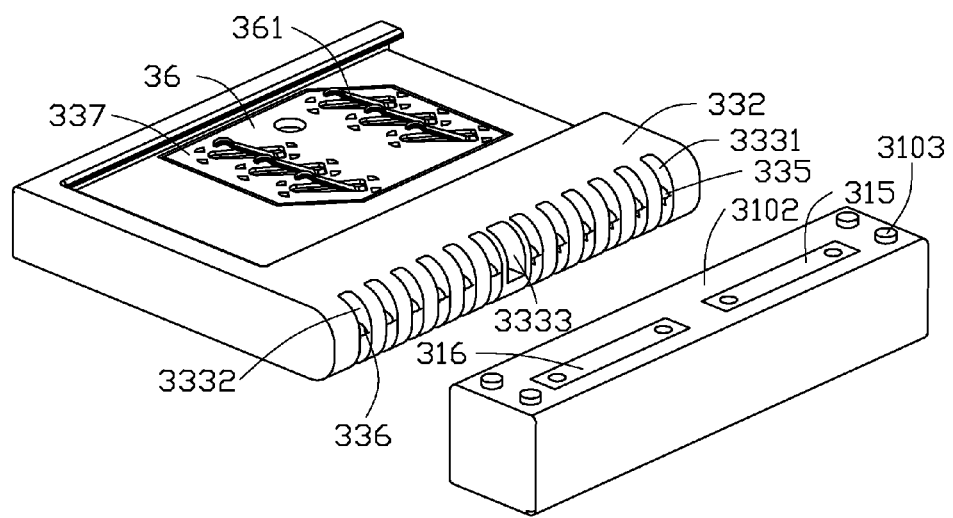
FIG. 3 is another exploded view of the dual card connector similar to FIG. 2.

FIGS. 2 and 3 illustrate the dual card connector 30 in two exploded views, respectively. The circuit board 20 includes a surface 21 and a slot 22 defined through the surface 21. The dual card connector 30 includes a base body 31 and a holder 33. A first conductive terminal assembly 35 and a second conductive terminal assembly 36 are both mounted on the holder 33. The holder 33 is mounted to the base body 31. The first conductive terminal assembly 35 includes a plurality of first conductive terminals 351. The second conductive terminal assembly 36 includes a plurality of second conductive terminals 361.

The base body 31 is a rectangular box and includes a first side wall 3101, a second sidewall 3102 connected to the first sidewall 3101, an inserting slot 311, a plurality of first connecting terminals 312, a plurality of second connecting terminals 313, a first metal piece 315, and a second metal piece 316. Four fixing posts 3103 are arranged on four corners of the second sidewall 3102. The base body 31 is mounted in the slot 22 and the fixing posts 3103 are fixed to the circuit board 20 by hot melting technology. The fixing slot 22 can include four fixing holes defined in four corners of the slot 22 for receiving the fixing posts 3103 for facilitating positioning the base body 31.

The inserting slot 311 is defined through the first sidewall 3101 and includes an inner wall 3111. In at least one embodiment, a number of the first connecting terminals 312 and a number of the second connecting terminals 313 both are six. The first connecting terminals 312 and the second connecting terminals 313 are spaced apart and arranged on the inner wall 3111. A separating board 314 is further arranged on the inner wall 3111 between the first connecting terminals 312 and the second connecting terminals 313.

The first metal piece 315 and the second metal piece 316 are formed on the second sidewall 3102 by insert molding technology. The first metal piece 315 is electrically connected to the first connecting terminals 312 via wires (not shown), and the second metal piece 316 is electrically connected to the second connecting terminals 313 via wires (not shown), thereby electrically connecting the first connecting terminals 312 and the second connecting terminals 313 to the circuit board 20. In at least one embodiment, the first metal piece 315 and the second metal piece 316 each can include a plurality of portions separated from each other, each of the portions is electrically connected to each of the first connecting terminals 312 and the second connecting terminals 313. The first connecting terminals 312 and the second connecting terminals 313 can also extend through the second sidewall 3102 and directly connect to the first metal piece 315 and the second metal piece 316. When the base body 31 is mounted on the circuit board 20, the first metal piece 315 and the second metal piece 316 is soldered to the circuit board 20, thereby electrically connecting the first connecting terminals 312 and the second connecting terminals 313 to the circuit board 20.

The holder 33 includes a first surface 331, a second surface 332 opposite to the first surface 331, a side portion 333, an end portion 334, a plurality of first elastic pieces 335 and a plurality of second elastic pieces 336. The first surface 331 and the second surface 332 each define a sliding slot 337 for receiving the cards 40. The end portion 334 defines an opening 338 connected to the sliding slots 337, for providing an access for receiving or removing the cards 40 from the sliding slots 337.

The side portion 333 defines a plurality of first latching slots 3331, a plurality of second latching slots 3332, and a latching groove 3333 spaced between the first latching slot 3331 and the second latching slot 3332. In at least one embodiment, each first elastic piece 335 is exposed from a corresponding first latching slot 3331, each second elastic piece 336 is exposed from a corresponding the second latching slot 3332. The first conductive terminal assembly 35 and the second conductive terminal assembly 36 are mounted on a bottom wall (not shown) of the sliding slots 337. The first conductive terminal 351 and the second conductive terminal 361 are electrically connected to the first elastic pieces 335 and the second elastic pieces 336 via wires (not shown).

The side portion 333 is inserted in to the inserting slot 311, with the first connecting terminals 312 and the second connecting terminals 313 inserted into the first latching slots 3331 and the second latching slots 3332 and contacting the first elastic pieces 335 and the second elastic pieces 336, respectively. The separating board 314 is inserted into the latching groove 3333 to prevent signal confusion between the first connecting terminals 312 and the second connecting terminals 313, and also between the first conductive terminal assembly 35 and the second conductive terminal assembly 36. The first conductive terminal assembly 35 and the second conductive terminal assembly 36 are electrically connected to the first elastic pieces 335 and the second elastic pieces 336, the first connecting terminals 312 and the second connecting terminals 313, and the first metal piece 315 and the second metal piece 316, respectively. Two cards 40 are inserted into the sliding slots 337 via the openings 338, thereby electrically connecting the cards 40 to the first conductive terminal assembly 35 and the second conductive terminal assembly 36, respectively, thereby assembling the cards 40 to the dual card connector 30.

When cards 40 need to be disassembled, the cards 40 can be pulled out from the sliding slots 337 via the openings 338. In another way, the holder 33 can be detached from the base body 31 first, and then the cards 40 can be pulled out. In summary, the cards 40 can be conveniently assembled or disassembled to/from the dual card connector 30.

The holder 33 is detachably mounted to the base body 31, thus the first conductive terminal assembly 35 and the second conductive terminal assembly 36 are electrically connected to the circuit board 20 via corresponding communication paths formed on the holder 33 and the base body 31. The sliding slots 337 are in an overlapping arrangement and use the same circuit board 20, which saves space on the circuit board 20 and in the electronic device 100.

It is believed that the embodiments and their advantages will be understood from the foregoing description, and it will be apparent that various changes can be made thereto without departing from the spirit and scope of the disclosure or sacrificing all of its advantages, the examples hereinbefore described merely being embodiments of the disclosure.

What is claimed is:

1. A dual card connector comprising:
a holder defining two overlapped sliding slots for receiving cards, each sliding slot comprising a group of conductive terminal assemblies, the holder comprising a plurality of elastic pieces on one side, the elastic pieces connected to the conductive terminal assemblies; and
a base body comprising at least two groups of connecting terminals;
wherein the holder is detachably mounted to the base body, thus the elastic pieces are resisted and electrically connected to the connecting terminals;
wherein the base body comprises a first sidewall, the first sidewall defines an inserting slot, the holder is detachably mounted to the inserting slot;
wherein the base body further comprises a second sidewall, a first metal piece, and a second metal piece, the second sidewall is connected to the first sidewall, the first metal piece and the second metal piece are mounted on the second sidewall;
wherein the at least two groups connecting terminals comprise a plurality of first connecting terminals and a plurality second connecting terminals, the first connecting terminals and the second connecting terminals are spacingly arranged in the inserting slot and are electrically connected to the first metal piece and the second metal piece.

2. The dual card connector as claimed in claim 1, wherein the elastic pieces comprise a plurality of first elastic pieces corresponded to the first connecting terminals and a plurality of second elastic pieces corresponded to the second connecting terminals.

3. The dual card connector as claimed in claim 2, wherein the holder defines a plurality of first latching slots and a plurality of second latching slots on one side, each of the first elastic piece and each of the second elastic piece is secured in each of the first latching slot and each of the second latching slot, respectively, thus, the first elastic pieces and the second elastic pieces are electrically connected to the first connecting terminals and the second connecting terminals, respectively.

4. The dual card connector as claimed in claim 3, wherein the base body further comprises a separating board mounted between the first connecting terminal and the second connecting terminal, the holder defines a latching groove between the first latching slot and the second latching slot, the separating board is inserted into the latching groove.

5. The dual card connector as claimed in claim 1, wherein the holder comprises a first surface and a second surface opposite to the first surface, and an end portion, the end portion defines an opening, the two sliding slots are defined on the first surface and the second surface, respectively, and communicate with the opening.

6. The dual card connector as claimed in claim 5, wherein the group of conductive terminal assemblies comprises a first conductive terminal assembly and a second conductive terminal assembly, which are respectively mounted in the two sliding slots and electrically connected to the elastic pieces.

7. An electronic device, comprising:
a main body;
a circuit board mounted on the main body; and
a dual card connector comprising:
a holder defining two overlapped sliding slots for receiving cards, each sliding slot comprising a group of conductive terminal assemblies, the holder comprising a plurality of elastic pieces on one side, the elastic pieces connected to the conductive terminal assemblies; and
a base body mounted on the circuit board and comprising at least two groups of connecting terminals;
wherein the holder is detachably mounted to the base body, thus the elastic pieces are resisted and electrically connected to the connecting terminals;
wherein the base body comprises a first sidewall, the first sidewall defines an inserting slot, the holder is detachably mounted to the inserting slot;
wherein the base body further comprises a second sidewall, a first metal piece, and a second metal piece, the second sidewall is connected to the first sidewall, the first metal piece and the second metal piece are mounted on the second sidewall;
wherein the at least two groups connecting terminals comprise a plurality of first connecting terminals and a plurality second connecting terminals, the first connecting terminals and the second connecting terminals are spacingly arranged in the inserting slot and are electrically connected to the first metal piece and the second metal piece.

8. The electronic device as claimed in claim 7, wherein the elastic pieces comprise a plurality of first elastic pieces corresponded to the first connecting terminals and a plurality of second elastic pieces corresponded to the second connecting terminals.

9. The electronic device as claimed in claim 8, wherein the holder defines a plurality of first latching slots and a plurality of second latching slots on one side, each of the first elastic piece and each of the second elastic piece is secured in each of the first latching slot and each of the second latching slot, respectively, thus, the first elastic pieces and the second elastic pieces are electrically connected to the first connecting terminals and the second connecting terminals, respectively.

10. The electronic device as claimed in claim 9, wherein the base body further comprises a separating board mounted between the first connecting terminal and the second connecting terminal, the holder defines a latching groove between the first latching slot and the second latching slot, the separating board is inserted into the latching groove.

11. The electronic device as claimed in claim 10, wherein the first metal piece and the second metal piece are electrically connected to the circuit, thus the group of conductive terminal assemblies are electrically connected to the elastic pieces, and then electrically connected to the connecting terminals, and then electrically connected to the first metal piece and the second metal piece, and then electrically connected to the circuit board.

12. The electronic device as claimed in claim 7, wherein the holder comprises a first surface and a second surface opposite to the first surface, and an end portion, the end portion defines an opening, the two sliding slots are defined on the first surface and the second surface, respectively, and communicate with the opening.

13. The electronic device as claimed in claim 12, wherein the group of conductive terminal assemblies comprises a first conductive terminal assembly and a second conductive terminal assembly, which are respectively mounted in the two sliding slots and electrically connected to the elastic pieces.

14. The electronic device as claimed in claim 7, wherein the circuit board defines a slot, the base body is mounted in the slot.

* * * * *